United States Patent [19]

Motoshima et al.

[11] Patent Number: 5,510,930
[45] Date of Patent: Apr. 23, 1996

[54] LIGHT AMPLIFYING APPARATUS

[75] Inventors: Kuniaki Motoshima; Tadayoshi Kitayama; Junichiro Yamashita; Eiichi Nakagawa, all of Kamakura; Shigeyuki Akiba; Masatoshi Suzuki, both of Kamifukuoka; Koji Goto, Tokyo; Haruo Abe, Tokyo; Naoki Norimatsu, Tokyo, all of Japan

[73] Assignee: Mitsubishi Denki Kabushiki Kaisha, Tokyo, Japan

[21] Appl. No.: 276,408

[22] Filed: Jul. 18, 1994

[30] Foreign Application Priority Data

Jul. 19, 1993 [JP] Japan ................... 5-177719

[51] Int. Cl.⁶ ................................ H01S 03/00
[52] U.S. Cl. ................. 359/341; 359/176; 359/160
[58] Field of Search ...................... 354/345, 341, 354/176, 160

[56] References Cited

U.S. PATENT DOCUMENTS

| | | |
|---|---|---|
| 4,554,510 | 11/1985 | Shaw et al. . |
| 5,015,054 | 5/1991 | Chaffee . |
| 5,058,974 | 10/1991 | Mollenauer . |
| 5,115,338 | 5/1992 | DiGiovanni et al. . |
| 5,187,759 | 2/1993 | DiGiovanni et al. . |
| 5,216,728 | 6/1993 | Charlton et al. . |
| 5,241,414 | 8/1993 | Giles et al. ............ 359/341 |
| 5,367,587 | 11/1994 | Mizuochi et al. ......... 385/27 |

FOREIGN PATENT DOCUMENTS

| | | |
|---|---|---|
| 0392490 | 10/1990 | European Pat. Off. . |
| 0415438 | 3/1991 | European Pat. Off. . |
| 0404152 | 10/1991 | European Pat. Off. . |
| 0444694 | 9/1992 | European Pat. Off. . |
| 0449275 | 10/1992 | European Pat. Off. . |
| 2550645 | 6/1984 | France . |
| 4005867 | 8/1991 | Germany . |
| 61-133688 | 6/1986 | Japan . |
| 3215982 | 9/1991 | Japan . |
| 2242091 | 9/1991 | United Kingdom . |

OTHER PUBLICATIONS

"Optical Amplifiers and Their Applications", IEEE Jul. 4–6, 1993 Yokohama, Japan.

Matsuoka, et al, Supervisory Signal Transmission Methods for Optical Amplifier Repeater Systems, pp. 1845–1850 Transmission Systems Laboratories, Japan.

*Primary Examiner*—Mark Hellner
*Attorney, Agent, or Firm*—Wolf, Greenfield & Sacks

[57] ABSTRACT

A light amplifying apparatus adopting a redundant structure. Optical isolators 13, 14 are inserted between pump light sources 1, 2 and a photocoupler 4 so as to prevent injection locking, thereby preventing fluctuation of pump power.

In another embodiment, optical fibers 15 adequately longer than the coherence length of the excitation light waves output from the pump light sources are provided. In still another embodiment, the frequency of the driving current for the pump light sources is modulated. In a further embodiment, wave plates 20, 21 are provided so as to circularly polarize the light waves output from the pump light sources clockwise and counterclockwise.

6 Claims, 11 Drawing Sheets

LIGHT AMPLIFYING APPARATUS

BACKGROUND OF THE INVENTION

1. Field of the Invention

The present invention relates to a light amplifying apparatus composed of an optical fiber with a rare earth element or a transition metal added thereto so as to provide an amplifying function and, more particularly, to a light amplifying apparatus which can stabilize the pump power in a redundant structure composed of a plurality of fiber light amplifiers which are excited by a plurality of pump light sources.

2. Description of the Related Art

A fiber light amplifier is advantageous in that it does not depend upon the transmission speed unlike a conventional optical repeater having 3R (Reshaping, Retiming and Regenerating) functions, it is possible to simplify an optical repeater and it is possible to enlarge the transmission capacity by multiplexing wavelengths. As a result, a fiber light amplifier is expected to have wide application ranging from a submersible optical repeater system to an optical CATV distribution system. A fiber light amplifier generally has a bandwidth in the order of THz, and an optical signal of large information capacity of more than G bit/s is generally amplified in order to utilize the wide band. A communication equipment dealing with such large information capacity is required to have a very high reliability. Especially, it is very important to enhance the reliability of a pump light source, which is the only photoactive element used for a fiber light amplifier. However, since a pump light source is generally required to have a high output such as more than 10 mW, there is a limitation to the increase of the reliability of a single pump light source. A redundant structure using a plurality of pump light sources is therefore generally adopted.

One of those conventional redundant structures is disclosed in U.S. Pat. No. 5,173,957. FIG. 9 is a block diagram of the conventional redundant structure disclosed in this literature. In FIG. 9, the reference numerals 1 and 2 represent pump light sources, 3 an output stabilization driving circuits for the pump light sources 1 and 2, 4 a 3 dB coupler (photocoupler), 5 and 6 optical couplers, 7 and 8 optical fibers with a rare earth element (or a transition metal) added thereto, 9 and 11 signal input terminals, and 10 and 12 signal output terminals.

The operation of this fiber light amplifier will now be explained. The pump light sources 1, 2 are driven by the output stabilization driving circuit 3 so that the currents of the photodiodes for a monitor which are provided within the pump light sources 1, 2 are constant, and the optical outputs which are approximately constant irrespective of a fluctuation in the temperature, supply voltage or the like are input to the 3 dB coupler 4. When the optical outputs which have no relation to each other are input, the 3 dB coupler 4 outputs 50% of the respective optical powers to the respective output ports in accordance with the required characteristics. The pump light waves are supplied to the optical fibers 7, 8 with a rare earth element added thereto (hereinunder referred to simply as "optical fiber(s)") through the optical couplers 5, 6 on the basis of the outputs. The pump light forms population inversion in the optical fibers 7, 8, and the feeble optical signals input from the signal input terminals 9, 11 are amplified at a predetermined amplifier gain. The amplified optical signals are output from the signal output terminals 10, 12.

In a fiber light amplifier adopting such a redundant structure, even if the pump light source 1 is deteriorated and light emission is stopped, it is possible to operate the fiber light amplifier by 50% of the pump power at the normal time by using only the pump power which is supplied from the excitation light source 2. It is possible to hold down the decrease in the gain to an insignificant value by properly designing the system level diagram. In contrast, in the case of exciting the optical fiber 7 only by the pump light source 1 without the use of the 3 dB coupler 4, the optical fiber 7 operates as a saturated absorber when the light emission of the pump light source 1 is stopped. As a result, the optical fiber 7 has a large loss with respect to the input signal having a small power, and the transmission line having the optical fiber 7 along the route is interrupted. In this way, adoption of a redundant structure enables the reliability of the system to be enhanced.

In the above-described example, the 3 dB coupler 4 ideally operates as a 50% power distributor. In other words, since the pump light sources 1 and 2 are separate light sources, the phases fluctuate independently of each other even if the frequencies thereof are equal, so that the distribution ratio of the 3 dB coupler 4 averaged by an adequately longer time than the coherence time of the pump light sources 1 and 2 becomes constant. The coherence time of a semiconductor laser which is generally used as a pump light source is not more than 1 µS. This value is sufficiently smaller than the minimum response time constant 10 µS of an erbium-doped optical fiber, which is most generally used as the optical fiber 7 (8), to a fluctuation of the pump power. Therefore, the pump powers are constant within the response time constants of the optical fibers 7, 8, and the gains thereof do not fluctuate.

However, when two light waves having the same frequency are input to the 3 dB coupler 4, which is the key component in the redundant structure shown in FIG. 9, the splitting ratio of the 3 dB coupler 4 varies in accordance with the phase relationship between the two light waves, which may lead to a fluctuation of the gains of the optical fibers 7, 8. If the pump light sources 1, 2 are coupled with each other due to a cross talk between the input ports of the 3 dB coupler 4 or the reflection from the devices connected to the output ports of the 3 dB coupler 4 and assume an injection locking state, the phase relationship is sometimes maintained for a longer time than the coherence time of the single excitation light source 1 (2).

FIG. 10 shows the emission spectra of the pump light sources 1 and 2 with and without injection locking. In FIG. 10, the reference numeral 101 represents the emission spectrum of the pump light source 1 when injection locking is not caused, and 102 the emission spectrum of the pump light source 1 at the time of injection locking. The reference numeral 103 denotes the injection locking pull-in width $\Delta f$ of the pump light source 1. The reference numeral 104 represents the emission spectrum of the pump light source 2. When the feeble light power from the pump light source 2 is coupled with that from the pump light source 1 and the oscillation frequencies f2 and f1 thereof adequately approach each other, the pump light source 1 stops the oscillation of the frequency f1 so as to output the light having the frequency f2. This phenomenon is called injection locking and is described, for example, on p 58 of "The Fundamental Studies of Semiconductor Laser", edited by the Society of Applied Physics, 1987 (published by Ohm).

At this time, the frequency of the input light to the pump light source 1 coincides with the frequency of the output light from the pump light source 1 (f1 moves to f2, as shown in FIG. 10), and the phase depends upon the difference between the frequencies of the light waves before and after the injection locking (the value corresponding to "f1–f2" in FIG. 10) while the phase difference is maintained in the range of −90° to +90° (coherent state). Therefore, in an injection locking state, the splitting ratio of the 3 dB coupler 4 varies depending upon the phase difference between the input light waves to the 3 dB coupler 4. Injection locking is caused when f1 and f2 satisfy the following condition:

$$|f1-f2|<\Delta f \tag{1}$$

wherein $\Delta f$ is a injection locking pull-in width which is proportional to the field strength of the light injected from the pump light source 2 and input to the pump light source 1 and it is represented by the following formula:

$$\Delta f = \frac{\sqrt{Pi/Pl(1-R1)}}{4\pi\tau p \sqrt{R1}} \tag{2}$$

wherein Pi, Pl represent the power of the injected light and the self-excited power, respectively, within the pump light source 1, $\tau p$ the photon life time in the interior resonator of the pump light source 1, and R1 the front facet reflectivity of the pump light source 1. The photon life time $\tau p$ is generally about 3 ps in a high-output semiconductor laser. The front facet reflectivity R1 is several % in a high-output semiconductor laser. If it is assumed that the cross talk between the input ports of the 3 dB coupler 4 is 60 dB and the front facet reflectivity R1 is 3%, the injection locking pull-in width $\Delta f$ is 138 MHz. Since the line width of the emission spectrum of a high-output semiconductor laser is about several MHz, it is to be understood that there is a large probability of injection locking.

FIG. 11 shows the fluctuation characteristics of the splitting ratio of the 3 dB coupler 4 at the time of injection locking. The reference numerals 105, 106 represent the distribution ratios of the two output ports of the 3 dB coupler 4. If it is assumed that the phase difference of the light waves input from the pump light sources 1 and 2 is $\psi$, the distribution ratios LA, LB of the through port A and the cross port B, respectively, seen from the pump light source 1 are represented by the following formulas:

$$LA = \frac{1}{2}(1-\sin\psi) \tag{3}$$

$$LB = \frac{1}{2}(1+\sin\psi) \tag{4}$$

As is clear from the above formulas (3) and (4), when the two light waves in a coherent state are input, the splitting ratio of the 3 dB coupler 4 is a function of the phase difference $\psi$ of the light waves. When the phase difference $\psi$ is 90°, all the light power is output from the through port A, and when the phase difference $\psi$ is −90°, all the light power is output from the cross port B. The phase difference $\psi$ is determined by the length L of the fiber which connects the pump light source 1, the 3 dB coupler 4 and the pump light source 2, and the difference f1–f2 between the self-oscillation frequencies of the pump light sources 1 and 2. Although the fiber length L is constant, the self-oscillation frequencies f1, f2 of the pump light sources 1 and 2 vary at random. Since the oscillation frequencies f1 and f2 of the pump light sources 1 and 2, fluctuate at random, which is the main cause of the fluctuation of the phase difference $\psi$ of the light waves, the distribution ratios 105 and 106 of the through port A and the cross port B, respectively, show complementary and random variation characteristics. The random variations of the self-excited oscillation frequencies f1, f2 contain a very low frequency component, and the gains of the optical fibers 7, 8 fluctuate in response to the low frequency component. The fluctuation of the gains of the optical fibers 7, 8 are characteristic in that they are complementary.

In this way, in a conventional redundant structure adopted by a fiber light amplifier, since the pump light sources 1 and 2 are coupled with each other and injection locking is caused, two light waves in a coherent state are input to the 3 dB coupler 4 and the pump powers input to the optical fibers 7, 8 fluctuate, so that the gains of the optical fibers 7, 8 themselves fluctuate.

SUMMARY OF THE INVENTION

Accordingly, it is an object of the present invention to provide a light amplifying apparatus which can solve the above-described problems in the related art.

To achieve this end, in a first aspect of the present invention, there is provided a light amplifying apparatus characterized in that an optical isolator is inserted between a pump light source and a 3 dB coupler. The insertion of the optical isolator can prevent the occurrence of injection locking.

In a second aspect of the present invention, there is provided a light amplifying apparatus characterized in that an optical fiber which is adequately longer than the coherence length of a pump light source is inserted between the pump light source and a 3 dB coupler. The insertion of the optical fiber can adequately lower the coherence of two light waves which are input to the 3 dB coupler.

In a third aspect of the present invention, there is provided a light amplifying apparatus characterized in that the line width of the emission spectrum of a pump light source is enlarged to a width the same as or larger than the injection locking bandwidth by modulating the frequency of a pump light source. The frequency modulation can prevent the occurrence of injection locking.

In a fourth aspect of the present invention, there is provided a light amplifying apparatus characterized in that the light waves output from the pump light sources are circularly polarized clockwise and counterclockwise, respectively. This polarization can prevent the occurrence of interference at the 3 dB coupler even if injection locking is caused.

A light amplifying apparatus according to the present invention can suppress the fluctuation of the gain of an optical fiber with a rare earth element added thereto which is unavoidable in a conventional redundant structure, and enables a stable operation while making the most of the high reliability of the redundant structure of the pump light sources.

The above and other objects, features and advantages of the present invention will become clear from the following description of the preferred embodiments thereof, taken in conjunction with the accompanying drawings.

DESCRIPTION OF THE PREFERRED EMBODIMENTS

First embodiment

Figure 1:
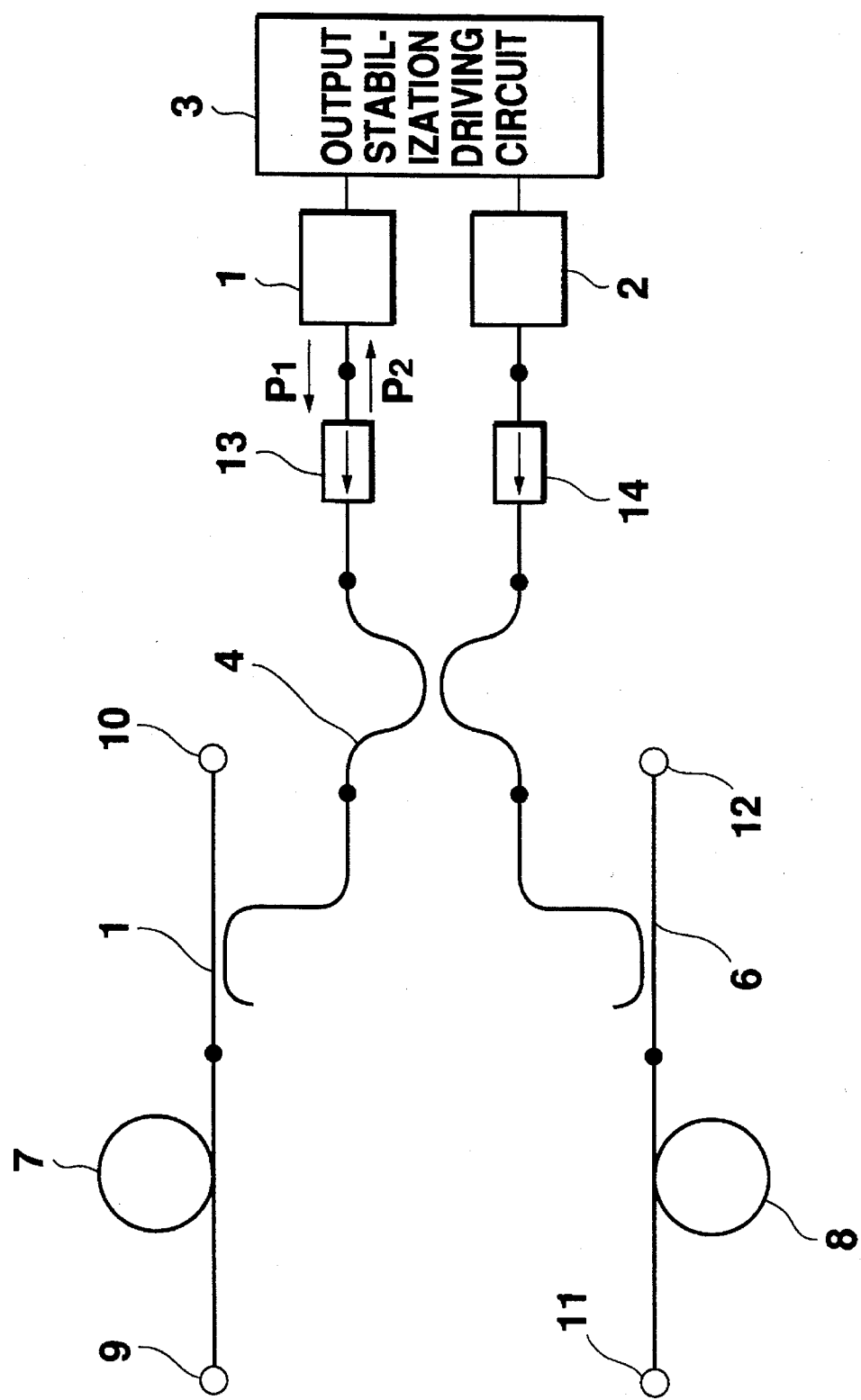
FIG. 1 is a block diagram of a first embodiment of a light amplifying apparatus according to the present invention.

FIG. 1 shows a first embodiment of a light amplifying apparatus according to the present invention. In the following embodiments, the same numerals are provided for the elements which are the same as those in the first embodiment, and explanation thereof will be omitted.

As shown in FIG. 1, in the light amplifying apparatus (fiber light amplifier), an optical isolator 13 is inserted between a pump light source 1 and a 3 dB coupler 4, and an optical isolator 14 is inserted between a pump light source 2 and the 3 dB coupler 4.

The operation of this light amplifying apparatus will now be explained. The optical isolators 13, 14 ordinarily have a forward insertion loss of not more than 1 dB and a reverse insertion loss of about 40 dB. In other words, the optical isolators 13, 14 have an operation of weakening the coupling power for the pump light sources 1 and 2 while keeping the loss of the excited power output from the pump light sources 1 and 2 small. The insertion of the optical isolators 13, 14 can reduce the injection locking pull-in width Δf. According to the above-described formula (2), if it is assumed that the reverse insertion loss of the optical isolators 13, 14 is 40 dB and the coupled photoelectric power of the pump light sources 1, 2 due to the cross talk between the input ports of the 3 dB coupler 4 is 60 dB, the injection locking pull-in width Δf is 1.38 MHz. This value of the injection locking pull-in width Δf is not more than the line width of the emission spectrum of an ordinary high-output semiconductor laser, so that the probability of injection locking is very small.

Figure 2:
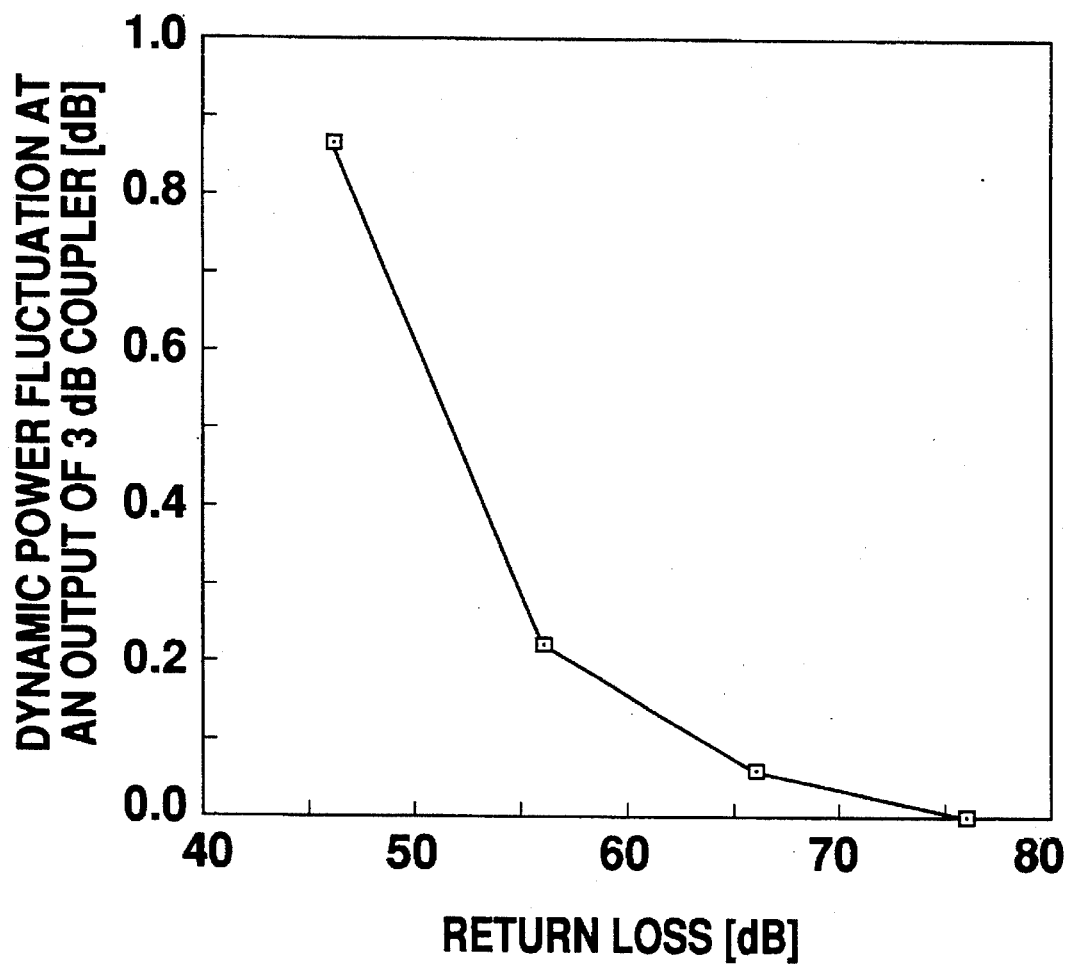
FIG. 2 shows the dynamic power fluctuation at an output of a 3 dB coupler with respect to a return-loss in the embodiment shown in FIG. 1.
Figure 11:
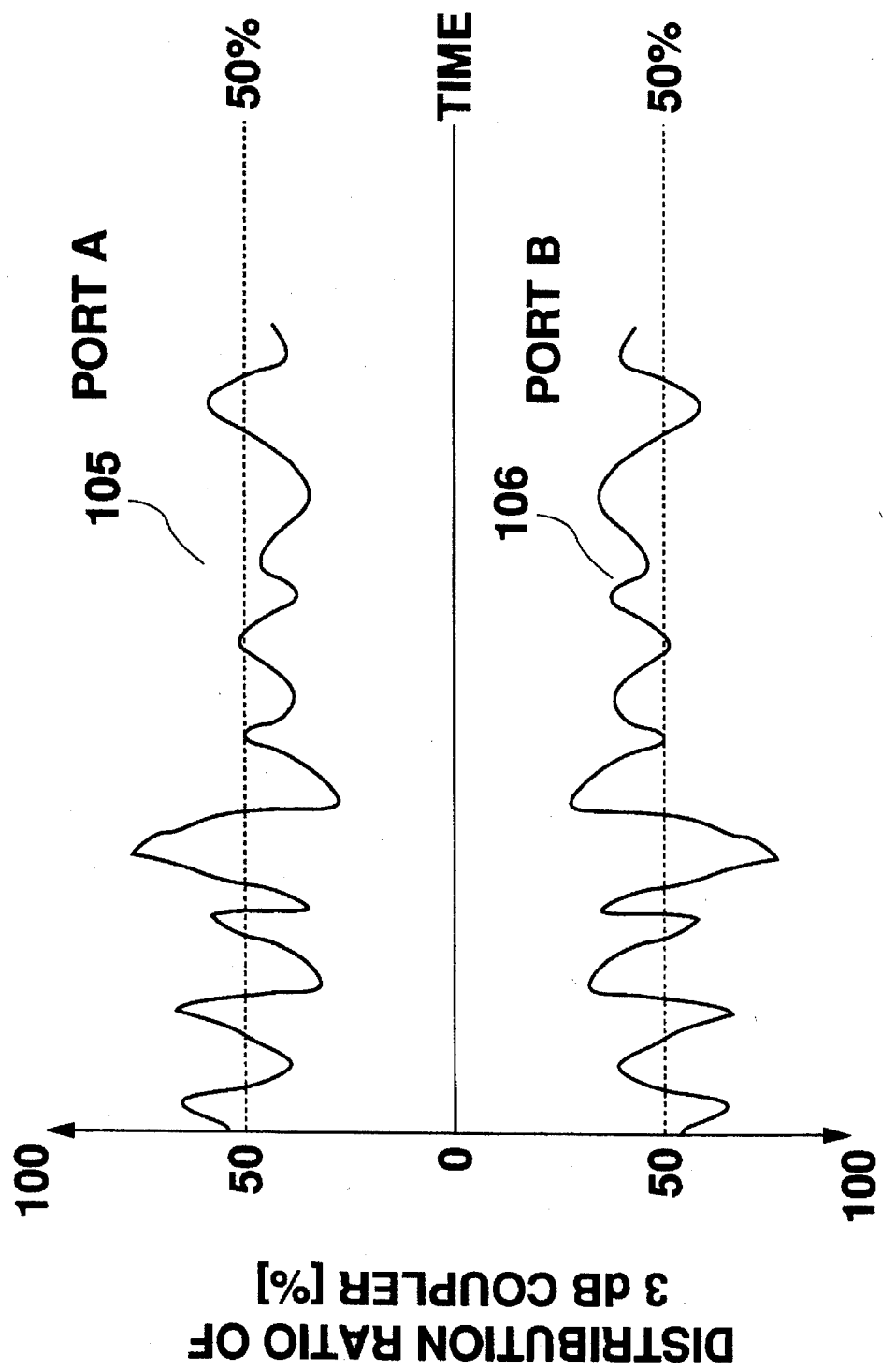
FIG. 11 shows the fluctuation characteristics of the splitting ratio of the 3 dB coupler at the time of injection locking in the light amplifying apparatus shown in FIG. 9.

FIG. 2 shows the measured values of the dynamic power fluctuation at an output of the 3 dB coupler 4 with respect to a return-loss. The return loss here is defined by the ratio "10 log (P1/P2)" of the photoelectric power P2 injected from the pump light source 2 to the pump light source 1 and the photoelectric power P1 output from the pump light source 1. The larger the return loss, the smaller the coupled photoelectric power of the pump light sources 1 and 2. The dynamic power fluctuation at an output of the 3 dB coupler 4 is defined by the peak value in the fluctuation of the splitting ratio shown in FIG. 11. As is understood from FIG. 2, the larger the return loss, the smaller the fluctuation of the splitting ratio. When the return loss reaches 76 dB, there is no fluctuation of the splitting ratio. This experimentally verifies the above-described relationship between the injection locking pull-in width Δf and the coupled photoelectric power of the pump light sources 1 and 2. That is, the insertion of the optical isolators 13, 14 adequately suppresses the fluctuation of the splitting ratio of the 3 dB coupler 4.

In the above explanation, injection locking is caused by the light injected from the pump light source 1 to the pump light source 2. It is, however, possible that injection locking is caused by the light injected from the pump light source 2 to the pump light source 1. With due consideration of such a case, the optical isolators 13 and 14 are inserted between the pump light source 1 and the 3 dB coupler 4 and between the pump light source 2 and the 3 dB coupler 4, respectively, in this embodiment, as shown in FIG. 1.

Second embodiment

Figure 3:
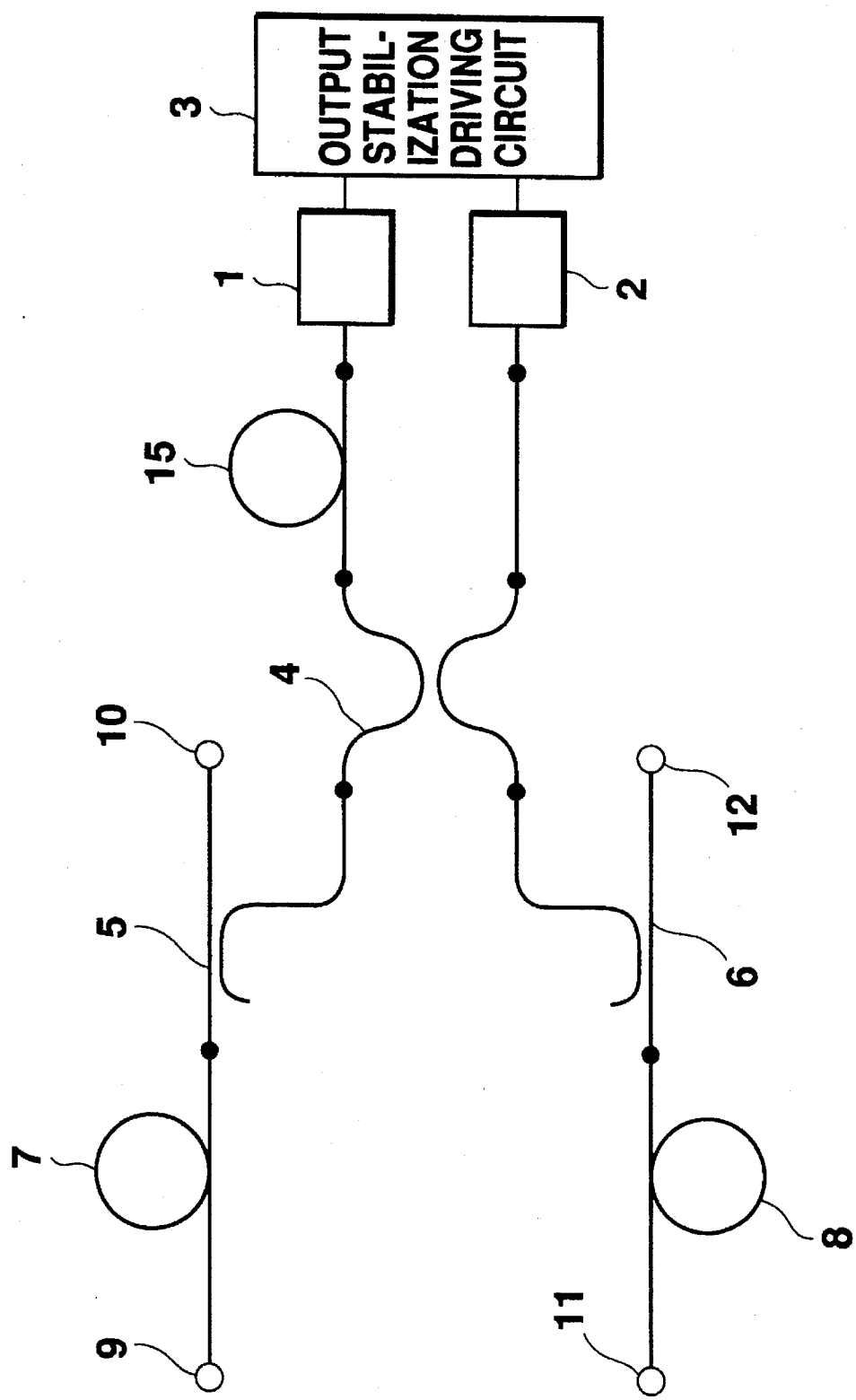
FIG. 3 is a block diagram of a second embodiment of a light amplifying apparatus according to the present invention.

FIG. 3 shows a second embodiment of a light amplifying apparatus according to the present invention. As shown in FIG. 3, an optical fiber 15 is provided between the pump light source 1 and the 3 dB coupler 4 in this embodiment. The length of the optical fiber 15 is set to be longer than the coherence length of the pump light sources 1, 2.

The operation of this light amplifying apparatus will now be explained. Due to the injection light which is input from the pump light source 2 to the pump light source 1, the pump light source 1 assumes an injection locking state and the light which is coherent with the injected light is output from the pump light source 1. However, since the optical path difference between the two light waves input to the 3 dB coupler 4 is enlarged by the insertion of the optical fiber 15, the phase relationship between the input light waves becomes random (incoherent), so that the interference is negligibly small. There are two routes from the pump light source 2 to the 3 dB coupler 4. By a first route, the light output from the pump light source 2 is directly input to the pump light source, while by a second route the light output from the pump light source 2 is input to the pump light source 1 through the 3 dB coupler 4 so as to be reflected and amplified, and thereafter input to the 3 dB coupler 4. The optical path length of the second route is longer than the optical path length of the first route by 2 nL, wherein n represents the refractive index (about 1.48) of the optical fiber 15 and L represents the length of the optical fiber 15. If the optical path difference 2nL is adequately longer than the coherence length of the pump light source 2, the interference between the light input to the 3 dB coupler 4 by the first route and the light input to the 3 dB coupler 4 by the second route is small, which leads to a small fluctuation of the splitting ratio of the 3 dB coupler 4.

Figure 4:
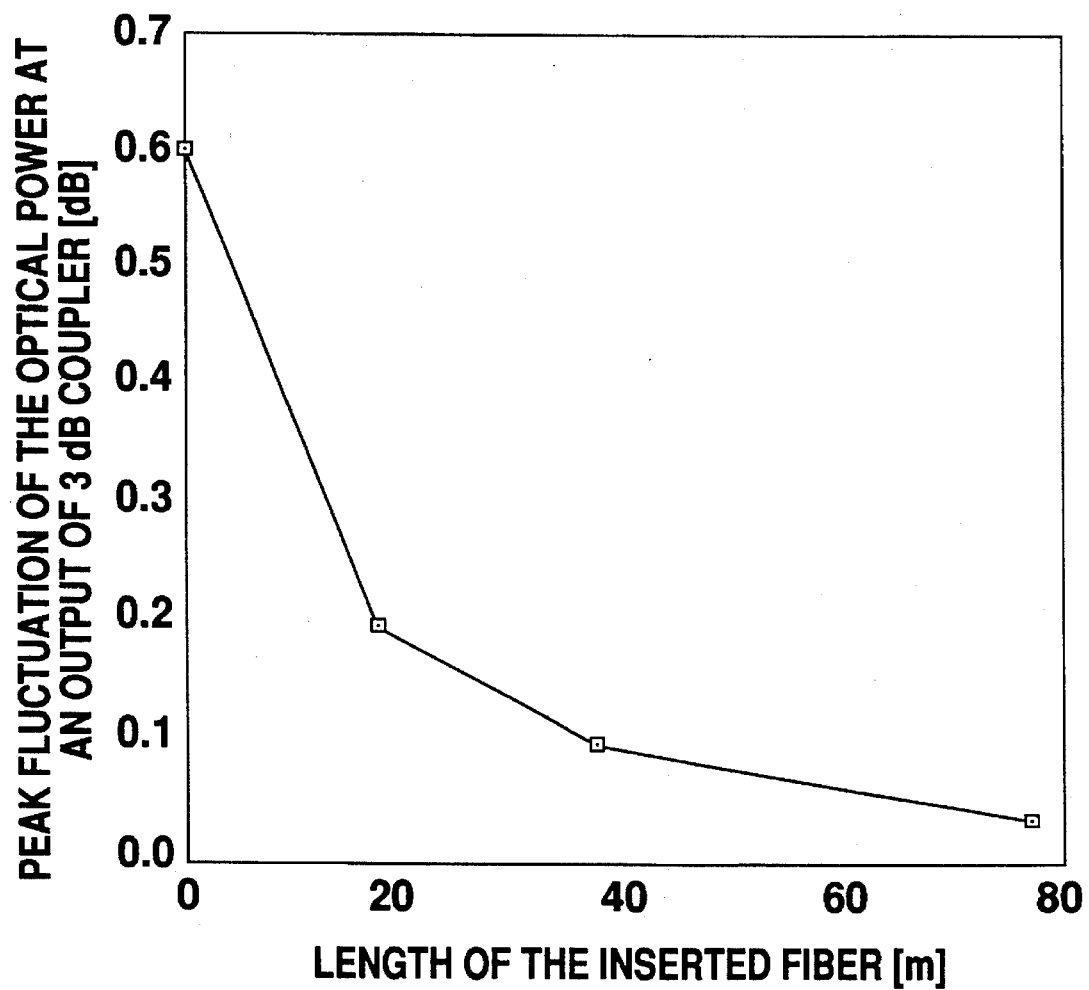
FIG. 4 shows the dependence of the fluctuation of the splitting ratio of the 3 dB coupler on the fiber length in the embodiment shown in FIG. 3.

FIG. 4 shows the dependence of the fluctuation of the splitting ratio of the 3 dB coupler on the fiber length. The line width of the emission spectrum used in the measurement is about 6 MHz. If it is assumed that the spectrum is a Gaussian spectrum, the coherence length is 32 m. It is generally known that the coherence of light exponentially decreases with respect to the optical path difference and that if the optical path difference is 5 times the coherence length, there is approximately no coherence. In the light amplifying apparatus of this embodiment, if it is assumed that the length of the optical fiber 15 is L, an optical path difference of 54 m is required. As is understood from FIG. 4, if the length L of the optical fiber 15 is about 50 m, the peak fluctuation of the optical power at an output of the 3 dB coupler 3 is suppressed to about not more than 0.1 dB. Furthermore, if the length L of the optical fiber 15 is about 80 m, the optical fiber 15 can suppress the peak fluctuation of the optical power at an output of the 3 dB coupler 3 to 0.04 dB, which is almost negligible.

Third embodiment

Figure 5:
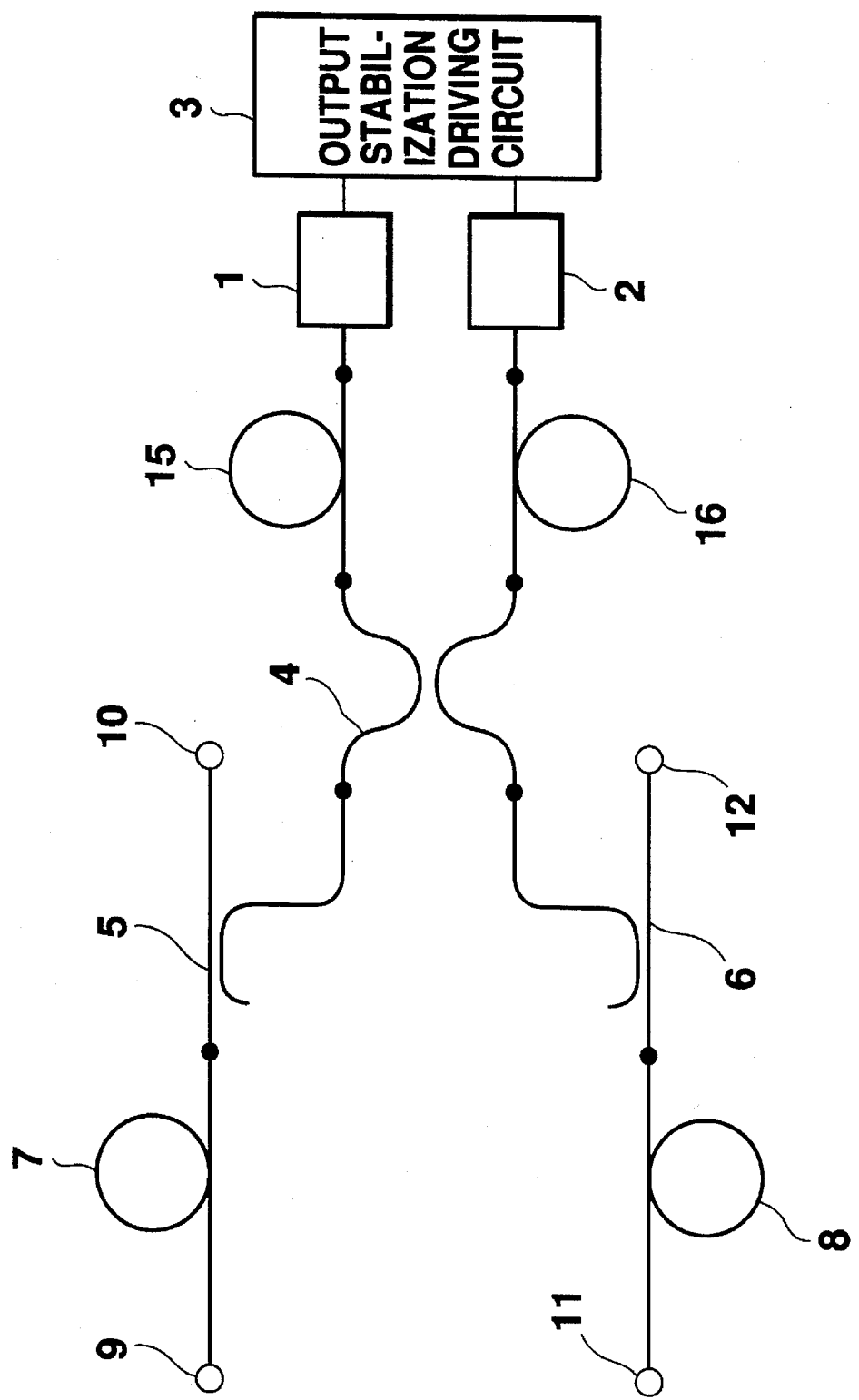
FIG. 5 is a block diagram of a third embodiment of a light amplifying apparatus according to the present invention.

FIG. 5 shows a third embodiment of a light amplifying apparatus according to the present invention. In the second embodiment, injection locking is caused by the light injected from the pump light source 1 to the pump light source 2. It is, however, possible that injection locking is caused by the light injected from the pump light source 2 to the pump light source 1. With due consideration of such a case, optical fibers 15 and 16 are inserted between the pump light source 1 and the 3 dB coupler 4 and between the pump light source 2 and the 3 dB coupler 4, respectively, in this embodiment, as shown in FIG. 5. Each of the optical fibers 15 and 16 has an effect of suppressing the fluctuation of the splitting ratio.

Fourth embodiment

Figure 6:
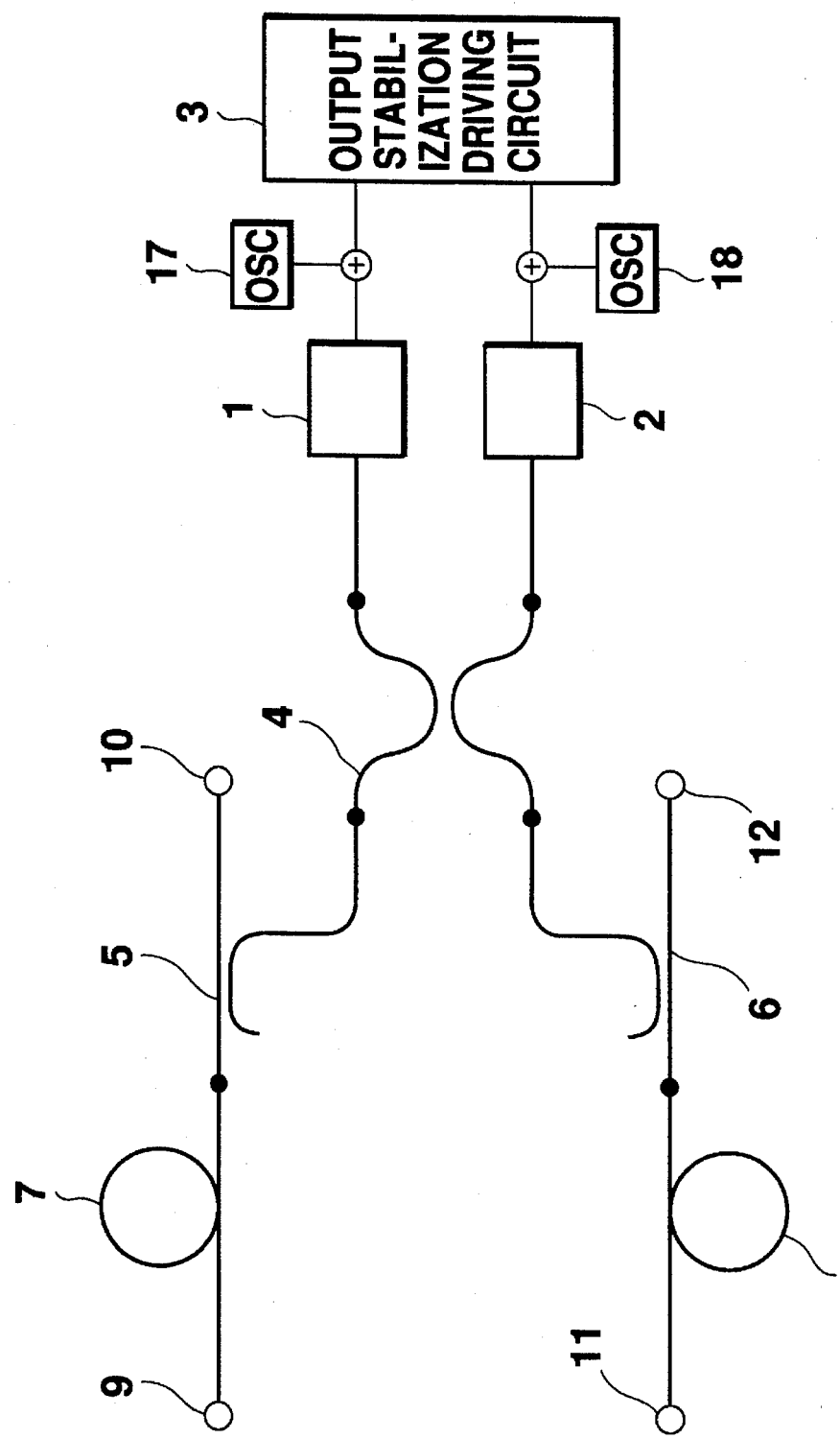
FIG. 6 is a block diagram of a fourth embodiment of a light amplifying apparatus according to the present invention.

FIG. 6 shows a fourth embodiment of a light amplifying apparatus according to the present invention. As shown in FIG. 6, an oscillator 17 is provided between the pump light source 1 and an output stabilization driving circuit 3, and an oscillator 18 is provided between the pump light source 2 and the output stabilization driving circuit 3.

The operation of this light amplifying apparatus will now be explained. The alternating currents supplied from the oscillators 17, 18 are superimposed on the driving currents for the pump light sources 1, 2. In the case of a semiconductor laser, the frequency of the emitted light is modulated by the alternating currents at a modulation efficiency of about several hundred MHz/mA, and the line width of the emission spectrum becomes wide in accordance with the modulated current. For example, if the frequency of the driving currents for the pump light sources 1, 2 is modulated at a modulation efficiency of 500 MHz/mA, the line widths of the emission spectra of the pump light sources 1, 2 by a modulated current of 3 mAp-p are 1.5 GHz. This value of the line width of the emission spectrum is more than 10 times the injection locking pull-in width 138 MHz, which is obtained from calculation in the related art.

In this way, by providing the oscillators 17, 18 in the light amplifying apparatus, it is possible to suppress the fluctuation of the splitting ratio of the 3 dB coupler 4 to not more than 1/10 even if injection locking is caused.

Fifth embodiment

Figure 7:
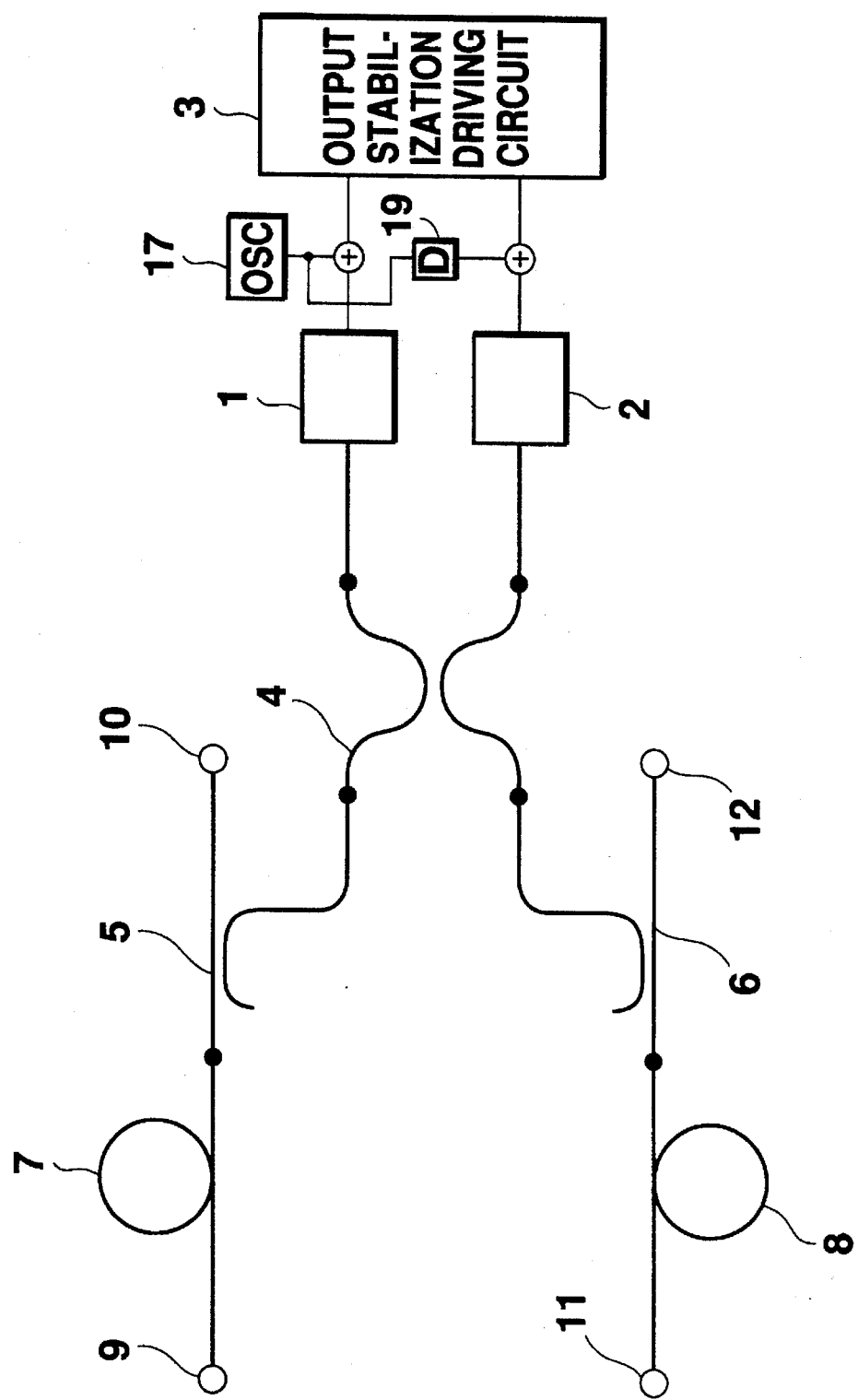
FIG. 7 is a block diagram of a fifth embodiment of a light amplifying apparatus according to the present invention.

FIG. 7 shows a fifth embodiment of a light amplifying apparatus according to the present invention. In the fourth embodiment, the two separate oscillators 17 and 18 are used. In this embodiment, the same effect is brought about by using one oscillator 17 and a phase shifter 19, as shown in FIG. 7. The alternating current output from the oscillator 17 is divided into a current which is directly input to the pump light source 1 and a current which is input to the pump light source 2 through the phase shifter 19. The phase shifter 19 delays the phase of the alternating current input thereto. The insertion of the phase shifter 19 in the light amplifying apparatus prevents the center frequencies of the pump light sources 1, 2 from fluctuating in the same phase, so that the same effect is produced as by the two separate oscillators 17, 18.

Sixth embodiment

In the fourth embodiment, the oscillation frequencies of the oscillators 17, 18 are not specified. In a sixth embodiment of a light amplifying apparatus according to the present invention, the oscillation frequencies are set at a higher value than the response frequencies of the optical fibers 7, 8 to the modulation of the pump powers, thereby producing an even higher effect. That is, if the oscillation frequencies of the oscillators 17, 18 are higher than the response frequencies of the optical fibers 7, 8 to the modulation of the pump powers, even if the outputs of the pump light sources 1, 2 are slightly fluctuated by the modulated currents, the gains of the optical fibers 7, 8 scarcely fluctuate. In addition, since the period at which injection locking occurs is longer than the response frequencies of the optical fibers 7, 8 to the modulation of the pump powers, the pump powers seem to the optical fibers 7, 8 to be constant, so that the gains of the optical fibers 7, 8 scarcely fluctuate.

Seventh embodiment

Figure 8:
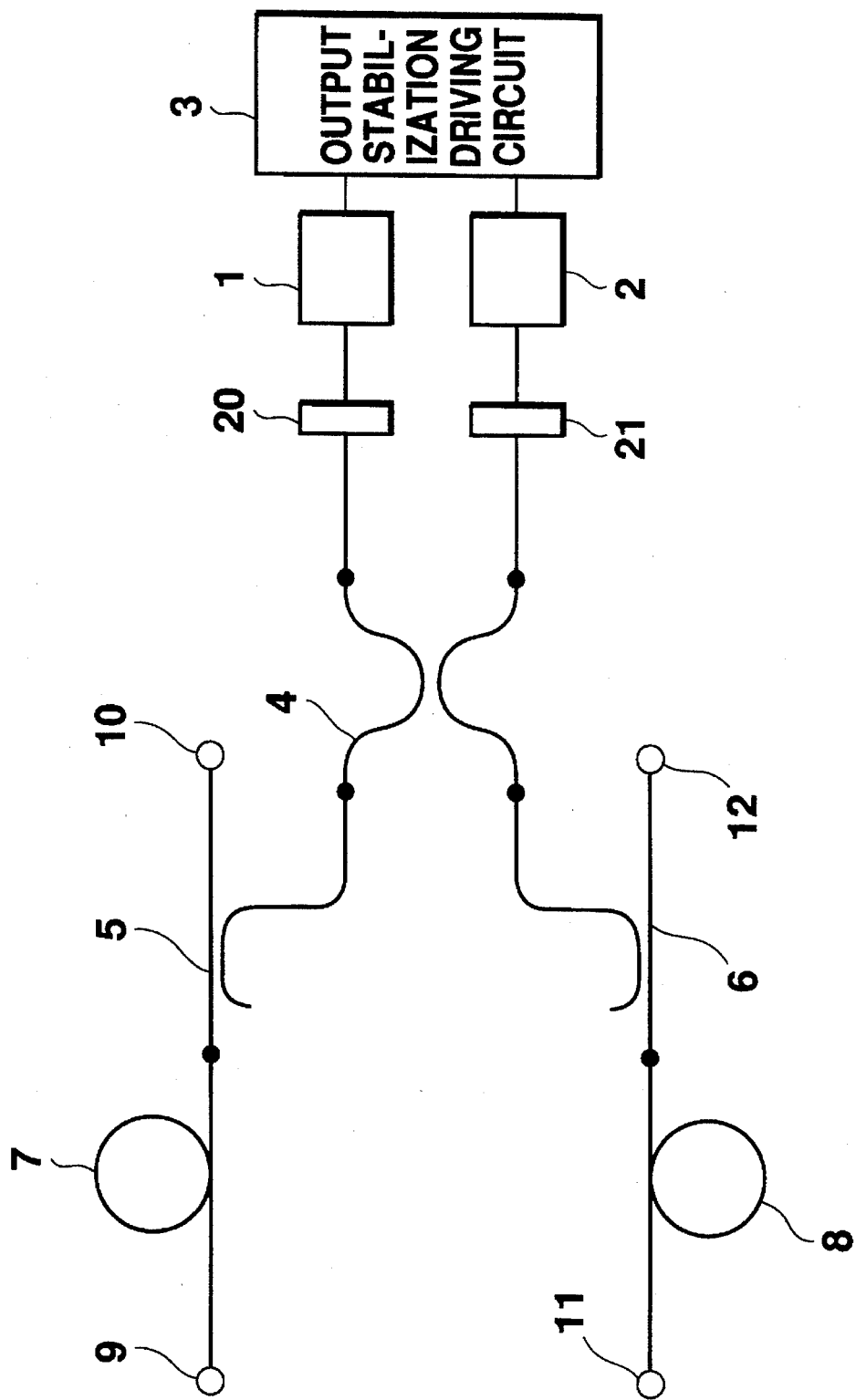
FIG. 8 is a block diagram of a seventh embodiment of a light amplifying apparatus according to the present invention.
Figure 9:
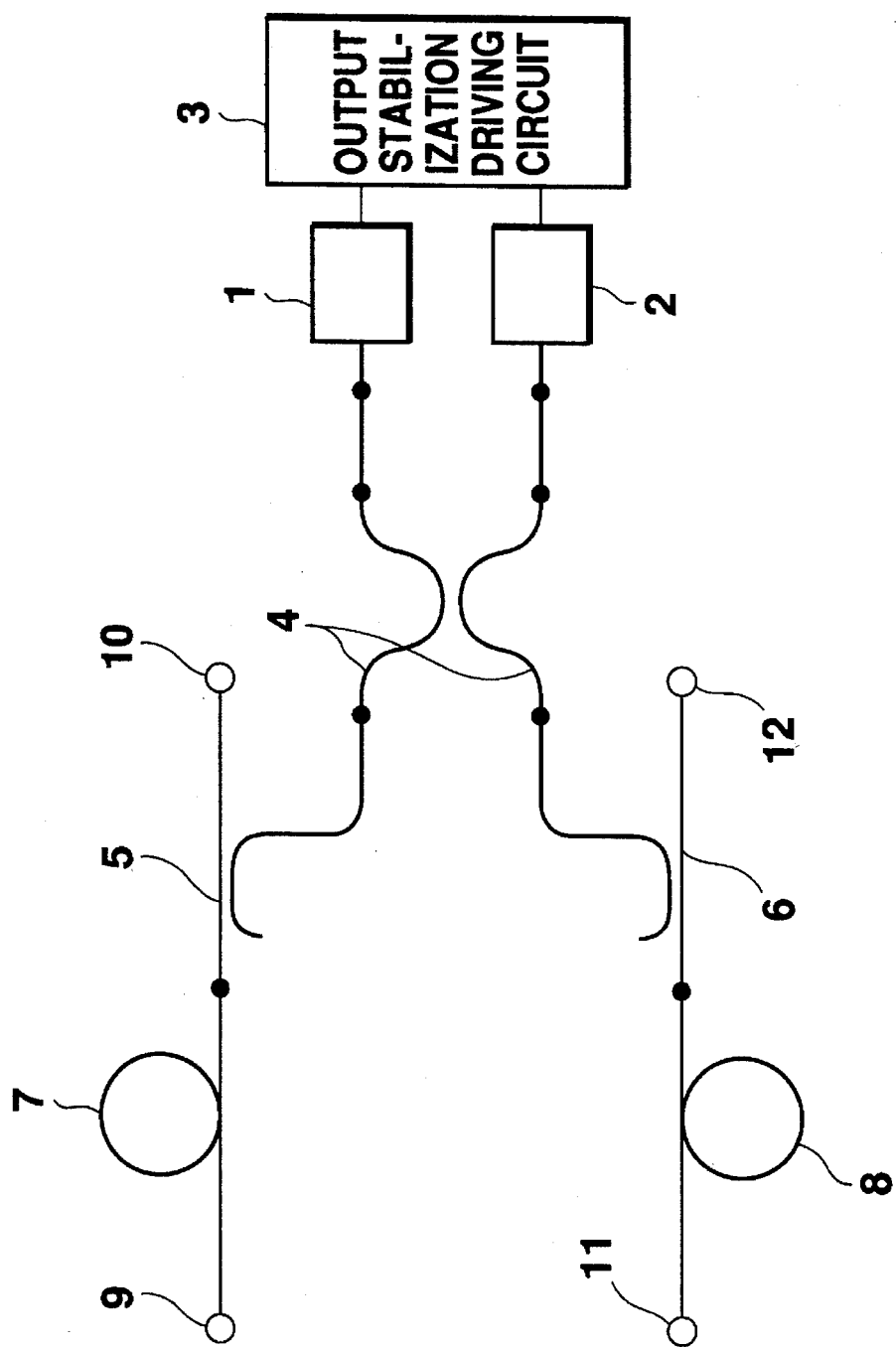
FIG. 9 is a block diagram of a conventional light amplifying apparatus.
Figure 10:
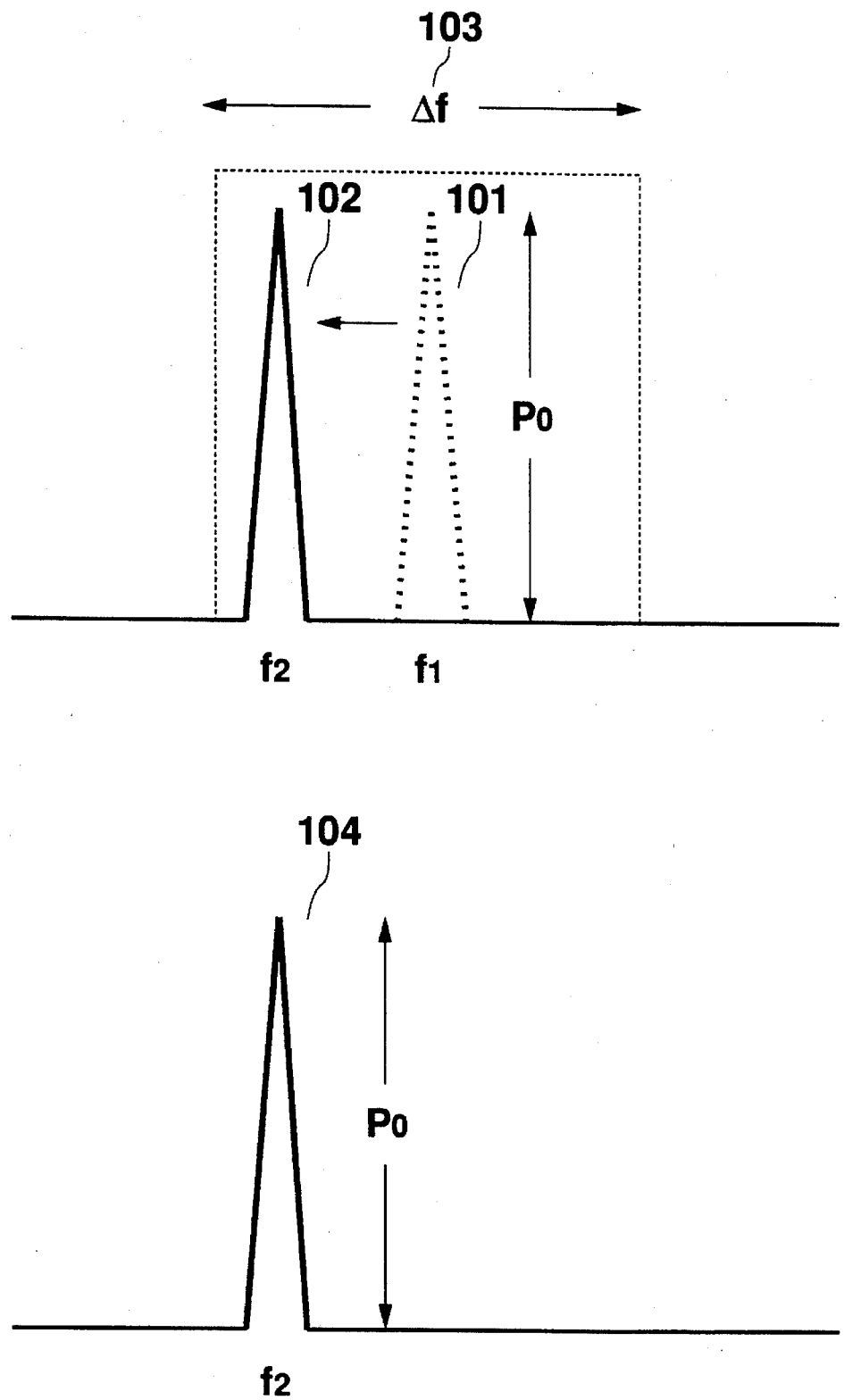
FIG. 10 shows the emission spectra of pump light sources at the time of injection locking in the light amplifying apparatus shown in FIG. 9.

FIG. 8 shows a seventh embodiment of a light amplifying apparatus according to the present invention. As shown in FIG. 8, a quarter-wave plate 20 is inserted between the pump light source 1 and the 3 dB coupler 4, and a quarter-wave plate 21 is inserted between the pump light source 1 and the 3 dB coupler 4.

The operation of the light amplifying apparatus will now be explained.

The linearly polarized light waves which are output from the pump light sources 1, 2 are input to the quarter-wave plates 20, 21, respectively, and the incident angles of the linearly polarized light waves are set so that the light waves output from the quarter-wave plates 20, 21 are circularly polarized in the opposite directions. The optical fibers 7, 8 each having an ordinary circular core have properties of keeping a circularly polarized wave. Since the light waves input to the 3 dB coupler 4 are circularly polarized in the opposite directions, even if the light waves have a coherence due to injection locking, there is no interference due to the orthogonality of polarized waves. In this way, by providing the quarter-wave plates 20, 21 in the light amplifying apparatus, the splitting ratio of the 3 dB coupler 4 is not fluctuated, so that the gains of the optical fibers 7, 8 are stabilized.

As explained above, according to a light amplifying apparatus of the present invention, since it is possible to stabilize the pump power while keeping the high reliability, it is possible to ensure the stable operation of the light amplifying apparatus.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A light amplifying apparatus adopting a redundant structure comprising:

pump light sources for outputting pump lights;

optical fibers to which a laser active metal composed of at least one selected from a group consisting of a rare-earth element and a transition metal is added;

an optical coupler for combining pump lights from said pump light sources and distributing said pump lights to said optical fibers; and means, coupled to the optical coupler and the pump light sources, for preventing injection locking of the pump light sources.

2. A light amplifying apparatus adopting a redundant structure comprising:

pump light sources for outputting pump lights;

optical fibers to which a laser active metal composed of at least one selected from a group consisting of a rare-earth element and a transition metal is added;

an optical coupler for combining pump lights from said pump light sources and distributing said pump lights to said optical fibers; and optical fibers which are longer than the coherence length of said pump lights from said pump light sources and each of which is inserted between each of said pump light sources and said optical coupler.

3. A light amplifying apparatus adopting a redundant structure comprising:

pump light sources for outputting pump lights;

optical fibers to which a laser active metal composed of at least one selected from a group consisting of a rare-earth element and a transition metal is added;

an optical coupler for combining pump lights from said pump light sources and distributing said pump lights to said optical fibers; and oscillators for superimposing an alternating current on a driving current for said pump light sources.

4. A light amplifying apparatus adopting a redundant structure comprising:

pump light sources for outputting pump lights;

optical fibers to which a laser active metal composed of at least one selected from a group consisting of a rare-earth element and a transition metal is added;

an optical coupler for combining pump lights from said pump light sources and distributing said pump lights to said optical fibers;

an oscillator for superimposing an alternating current on a driving current for one of said pump light sources; and phase shifters for shifting the phase of said alternating current supplied from said oscillator and superimposing said alternating current on a driving current for said pump light sources with different phases from each other.

5. A light amplifying apparatus according to either of claims 3 and 4, wherein the frequency of said oscillator is higher than the response frequencies of said optical fibers to the modulation of said pump light.

6. An apparatus for providing a plurality of optical signals from a plurality of light sources, having a redundant capability such that the optical signals are still provided when one or more of the plurality of light sources is disabled, the apparatus comprising:

an optical coupler for combining pump lights from said pump light sources and distributing said pump lights to said optical fibers; and means, coupled to the optical coupler, for preventing injection locking of the pump light sources.

* * * * *

UNITED STATES PATENT AND TRADEMARK OFFICE
CERTIFICATE OF CORRECTION

PATENT NO.    : 5,510,930
DATED         : April 23, 1996
INVENTOR(S)   : Kuniaki Motoshima et al.

It is certified that error appears in the above-identified patent and that said Letters Patent is hereby corrected as shown below:

This certificate supersedes Certificate of Correction issued August 13, 2002, the request for Certificate of Correction adding the Assignee -- Kokusai Denshin Denwa Co. Ltd., Tokyo, Japan -- was denied on July 26, 2002. The Certificate of Correction issued August 13, 2002 should be vacated since no Certificate of Correction was granted.

Signed and Sealed this

Fifth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO. : 5,510,930
DATED : April 23, 1996
INVENTOR(S) : Kuniaki Motoshima et al.

It is certified that error appears in the above-identified patent and that said Letters Patent is hereby corrected as shown below:

Title page,
Item [73], Assignee, please add -- Kokusai Denshin Denwa Co., Ltd., 3-2, Nishishinjuku 2-chome, Shinjuku-ku, Tokyo 163-03, Japan --

Signed and Sealed this

Twenty-eighth Day of October, 2003

JAMES E. ROGAN
*Director of the United States Patent and Trademark Office*